United States Patent [19]
Essery et al.

[11] 3,928,336
[45] Dec. 23, 1975

[54] 7-[D-(α-AMINO-α-PHENYL-, 2-THIENYL- AND 3-THIENYL-ACETAMIDO)]-3-(3-METHYL-1,2,5-OXADIAZOL-4-YL)CARBONYLTHIOMETHYL-3-CEPHEM-4-CARBOXYLIC ACIDS

[75] Inventors: John Michael Essery; Lee Cannon Cheney, both of Fayetteville, N.Y.

[73] Assignee: Bristol-Myers Company, New York, N.Y.

[22] Filed: July 29, 1974

[21] Appl. No.: 492,636

[52] U.S. Cl.............................. 260/243 C; 424/246
[51] Int. Cl.$^2$........................................ C07D 501/36
[58] Field of Search .................. 260/243 CN, 243 C

[56] References Cited
UNITED STATES PATENTS

| | | | |
|---|---|---|---|
| 3,719,673 | 3/1973 | Bickel et al. | 260/243 C |
| 3,776,907 | 12/1973 | Essery et al. | 260/243 C |
| 3,780,032 | 12/1973 | Essery et al. | 260/243 C |
| 3,804,832 | 4/1974 | Bickel et al. | 260/243 C |

Primary Examiner—Donald G. Daus
Assistant Examiner—Anne Marie T. Tighe
Attorney, Agent, or Firm—David M. Morse

[57] ABSTRACT

7-[D-(α-Amino-α-phenyl-, 2-thienyl- and 3-thienylacetamido]-3-(3-methyl-1,2,5-oxadiazol-4-yl)carbonylthiomethyl-3-cephem-4-carboxylic acids and their pharmaceutically acceptable salts are valuable as antibacterial agents, as nutritional supplements in animal feeds, as agents for the treatment of mastitis in cattle and as therapeutic agents in poultry and animals, including man. The compounds are especially useful in the treatment, particularly by oral administration, of infectious diseases caused by many Gram-positive and Gram-negative bacteria. Also included within the invention are easily cleavable esters of the abovementioned acids and pharmaceutically acceptable acid addition salts of said esters.

35 Claims, No Drawings

7-[D-(α-AMINO α-PHENYL-, 2-THIENYL- AND 3-THIENYL-ACETAMIDO)]-3-(3-METHYL-1,2,5-OXADIAZOL-4-YL)CARBONYLTHIOMETHYL-3-CEPHEM-4-CARBOXYLIC ACIDS

BACKGROUND OF THE INVENTION

1. Field of the Invention

The cephalosporins of the present invention possess the usual attributes of such compounds and are particularly useful in the treatment of bacterial infections by oral administration.

2. Description of the Prior Art

A. Cephalosporins in General

Cephalothin and cephaloridine are well-known antibacterial agents; see U.S. Pat. Nos. 3,218,318; 3,449,338 and 3,498,979. The literature also contains considerable data on the activity of cephaloglycin and cephalexin; see U.S. Pat. Nos. 3,303,193; 3,507,861 and 3,560,489 and Great Britain 985,747 and 1,054,806. Newer cephalosporins include cefazolin and cephapirin; see U.S. Pat. Nos. 3,516,997 [and also Netherlands 68/05179 (Farmdoc 34,328) and South Africa 68/4513] and U.S. Pat. No. 3,422,100.

The literature on cephalosporins has been reviewed by E. P. Abraham, Quart, Rev. (London) 21, 231 (1967) by E. Van Heyningen, Advan. Drug Res., 4, 1–70 (1967) and briefly in Annual Reports in Medicinal Chemistry, Academic Press, Inc., 111 Fifth Avenue, New York, N.Y., 10003, by L. C. Cheney on pages 96 and 97 (1967) and by K. Gerzon and R. B. Morin on pages 90–93 (1968) and by Gerzon on pages 79–80 (1969) and by L. H. Conover on pages 101–102 (1970). New cephalosporins are frequently reported at the annual Interscience Conference on Antimicrobial Agents and Chemotherapy as illustrated by Sassiver et al., Antimicrobial Agents and Chemotherapy - 1968 American Society for Microbiology, Bethesda, Maryland, pages 101–114 (1969) and by Nishida et al., ibid, 236–243 (1970). Two excellent reviews are the Cephalosporins; Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York. Two more recent reviews are β-Lactam Antibiotics: Their Physicochemical Properties and Biological Activities in Relation to Structure, J. P. Hou and J. W. Poole, J. Pharmaceutical Sciences, 60(4), 503–532 (April, 1971) and Chemistry of Cephalosporin Antibiotics, R. B. Morin and B. G. Jackson, Fortschr. Chem. Org. Naturst, 28, 343–403 (1970) which includes a section on nucleophilic displacement of the acetate group at pages 370–373.

The preparation of various 7-([α-aminoarylacetamido]-cephalosporanic acids and the corresponding desacetoxy compounds in which aryl represents unsubstituted or substituted phenyl or 2- or 3-thienyl is described, for example, in British Specifications 985,747, 1,017,624, 1,054,806 and 1,123,333, in Belgium patent 696,026 (Farmdoc No. 29,494), in U.S. Pat. Nos. 3,311,621, 3,352,858, 3,489,750, 3,489,751, 3,489,752, 3,518,260 and 3,575,969, in Japanese patent 16871/66 (Farmdoc 23,231), by Spencer et al., J. Med. Chem., 9(5), 746–750 (1966), by Ryan et al., J. Med. Chem., 12, 310–313 (1969) and by Kurita et al., J. Antibiotics (Tokyo) (A) 19, 243–249 (1966) and see also U.S. Pat. No. 3,485,819. British Specification 1,073,530 includes a disclosure of the preparation of such compounds by acylation of silylated 7-ACA.

Netherlands patents 68/11676 (Farmdoc 36,349) and 68/12382 (Farmdoc 36,496) and U.S. Pat. Nos. 3,489,750 and 3,489,751 disclose ring-substituted cephaloglycins.

B. 3-Thiomethylcephalosporins

Various cephalosporins, including cephalosporin C on occasion but not cephaloglycin, have been reacted with nucleophilic, aromatic mercaptans to produce compounds having the structure

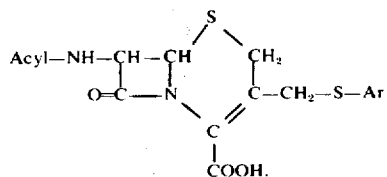

In U.S. Pat. No. 3,278,531 Ar is phenyl or certain substituted phenyls or certain aromatic heterocyclic rings named, for example, in column 5. Similar nucleophiles, e.g. 2-mercaptopyrimidines, are disclosed in U.S. Pat. No. 3,261,832 and Great Britain 1,101,422 and U.S. Pat. No. 3,479,350 and U.S. Pat. No. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 68/06129 and South Africa 2695/68), in Canada 818,501 (Farmdoc 38,845), in Great Britain 1,187,323 (Farmdoc 31,936: Netherlands 67,14888), in U.S. Pat. No. 3,530,123 and in U.S. Pat. No. 3,516,997 (Farmdoc 34,328; Netherlands 68/05179) which includes the compound named cefazolin, which has a tetrazolylacetyl sidechain on the 7-amino group and a 5-methyl-thiadiazolylthiomethyl group at the 3-position and is described at some length in the scientific literature, e.g. in Antimicrobial Agents and Chemotherapy - 1969, American Society for Microbiology, Bethesda, Md. at pages 236–243 and in J. Antibiotics (Japan) 23(3), 131–148 (1970).

Replacement of the 3-acetoxy group of a cephalosporin by various heterocyclic thiols has been disclosed in U.S. Pat. No. 3,563,983 and in Netherlands 70/05519 (Farmdoc 80, 188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol.

Various cephalosporins having the structure

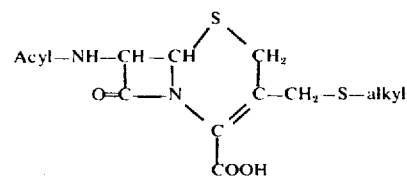

in which acyl represents various sidechains including α-aminophenylacetyl have been described in some of the above and by Glaxo in Belgium 734,532 (Farmdoc 41,619) and in Belgium 734,533 (Farmdoc 41,620) and by Lilly in Belgium 743,754 (Farmdoc 41,150R).

Cephalosporins having the structure

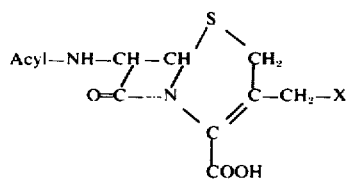

where X includes

and

are disclosed in many patents including some of the above and in U.S. Pat. Nos. 3,239,516, 3,239,515, 3,243,435, 3,258,461, 3,431,259, 3,446,803, 3,278,531, 3,261,832 and 3,573,298.

Related publications in the scientific literature include J. Med. Chem. 8, 174–181 (1965) and J. Chem. Soc. (London) 1595–1605 (1965), 5015–5031 (1965) and 1959–1963 (1967).

C. 3-Acylthiomethylcephalosporins

The following publications and patents disclose certain additional 7-ACA derivatives containing a 3-acylthiomethyl moiety (in which phenyl is abbreviated as Ph):

1. G. F. H. Green, J. E. Page, and S. E. Staniforth, J. Chem. Soc., 1595–605 (1965). This reference gives the proton magnetic resonance spectra of the 3-benzoylthiomethyl derivative of cephalothin.

Cocker et al., J. Chem. Soc., 1142–1151 (1966) adds thiopicolinyl and references Belgium 650,444.

2. J. D. Cocker, et al., J. Chem. Soc., 5015–31 (1965) discloses compounds having the structure

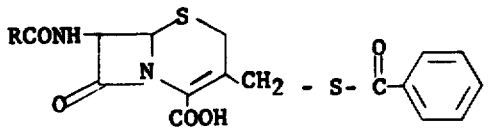

wherein R has the following meanings: PhCH$_2$—,

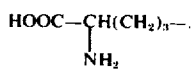

CH$_3$—S—CH$_2$—, Ph—CO—S—CH$_2$—,

HOOC—CH(CH$_2$)$_3$—
          |
          NH$_2$

Glaxo's U.S. Pat. No. 3,261,832 discloses compounds having the structure

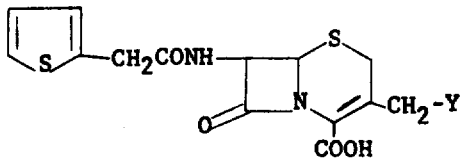

wherein Y has, for example, the following meanings:

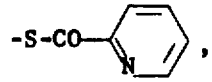

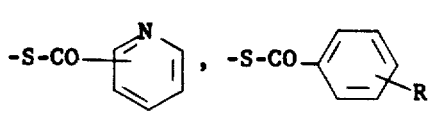

where R is CH$_3$O—, —NO$_2$, —CN, CH$_3$S—,

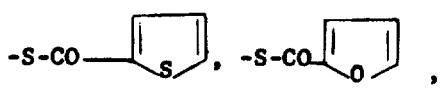
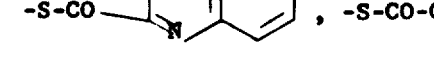

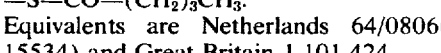
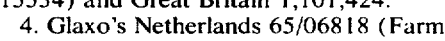

—S—CO—(CH$_2$)$_3$CH$_3$.

Equivalents are Netherlands 64/08066 (Farmdoc 15534) and Great Britain 1,101,424.

4. Glaxo's Netherlands 65/06818 (Farmdoc 19,306) discloses the reaction

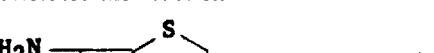

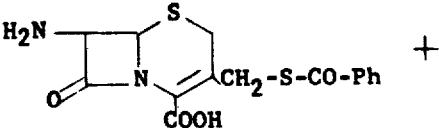

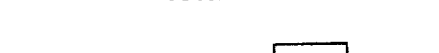

An equivalent is U.S. Pat. No. 3,502,665

5. Glaxo's Netherlands 64/11521 [Chem. Abstr., 63: 13,281d (1965)] discloses the reaction Ceph C <u>thioacid</u>→ HOOC—CH
                              |
                              NH$_2$

wherein Y — —S—CO—Ph or

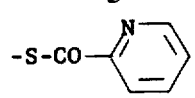

Equivalents are Great Britain 1,101,422 and Canada 796,747 (Farmdoc 17362).

6. Ciba's U.S. Pat. No. 3,555,017 discloses compounds having the structure

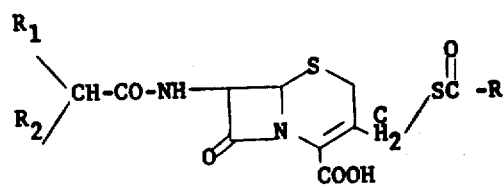

$R_1$ and $R_2$ = halogen.

As usual in Ciba's patents directed primarily to novel sidechains at the three-position, the R group above is defined broadly as the residue of a carboxylic acid and may be illustrated by phenyl, as the residue of thiobenzoic acid. Equivalents are Belgium 708,241 (Farmdoc 33,276), Great Britain 1,211,747 and French 1,575,554.

7. Ciba's British 1,211,718 discloses compounds having the structure

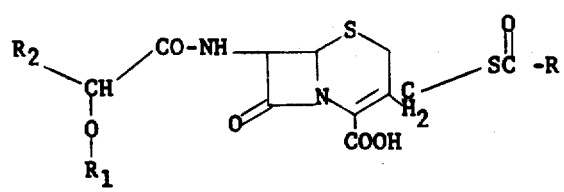

R as in 6 above. Equivalents are Belgium 708,311 (Farmdoc 33,277) and U.S. Pat. No. 3,557,104.

8. Ciba's Belgium 751,526 (Farmdoc 90,178R) discloses compounds having the structure

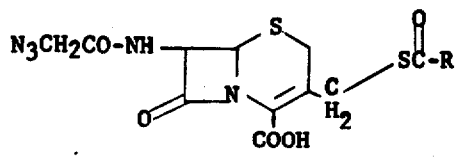

R as in 6 above.
An equivalent is Netherlands 70/08237.

9. Ciba's South Africa 69/8436 discloses compounds having the structure

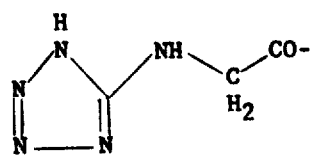

R as in 6 above.
Equivalents are Belgium 743,014 (Farmdoc 43,126R) and Netherlands 69,18611.

10. Ciba's South Africa 69/8399 discloses compounds having the structure

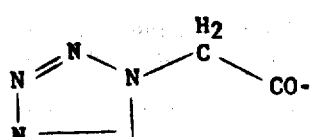

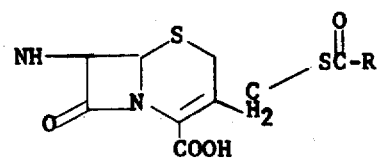

R as in 6 above.
Equivalents are Belgium 742,933 (Farmdoc 41,568R) and Netherlands 69/18531.

11. Ciba's South Africa 68/8185 discloses compounds having the structure

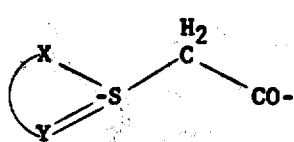

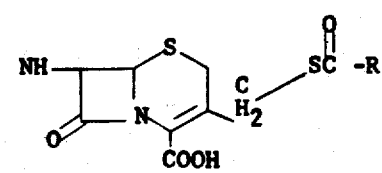

R as in 6 above.
An equivalent is Netherlands 68/18868.

12. Ciba's Netherlands 68/18868 discloses compounds having the structure

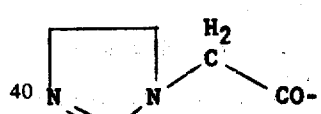

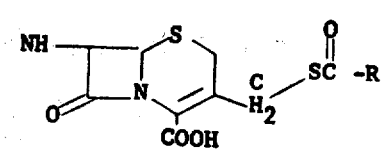

R as in 6 above.
Equivalents are South Africa 8120/68, German 1,817,121 and Belgium 726,316.

13. Fujisawa's Great Britain 1,187,323, for example, at page 5, lines 67–71 discloses compounds having the structure

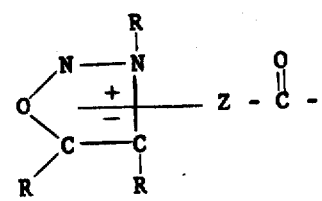

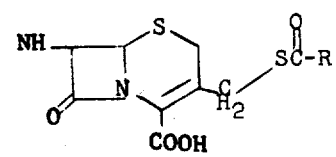

in which R represents methyl, thienyl, pyridyl, etc. and wherein general disclosure is made of other heterocyclic groups as at pages 1 and 2.

Equivalents are Netherlands 67/14888 (Farmdoc 31,936) and U.S. Pat. No. 3,530,123.

14. Fujisawa's Belgium 714,518 (Farmdoc 35,307) discloses (among many others) compounds having the structure

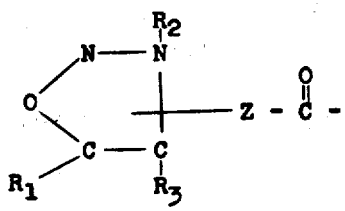

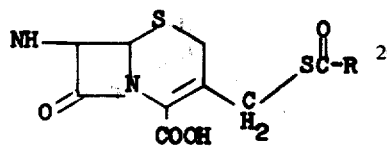

wherein R is as 13 above.

Equivalents are Netherlands 68/06129 and South Africa 2695/68.

15. Glaxo's U.S. Pat. No. 3,243,435 and Belgium 650,444 (Farmdoc 15,535) disclose generally a vast variety of compounds having the structure

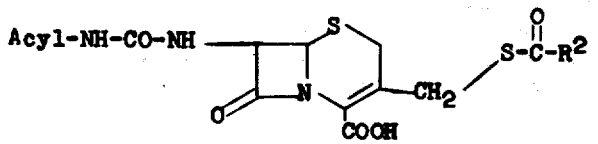

wherein $R^2$, is defined, e.g. in columns 1 and 4, to include various heterocyclic groups.

16. Ciba's South Africa 65/6950 (Farmdoc 22,192) discloses compounds having the structure

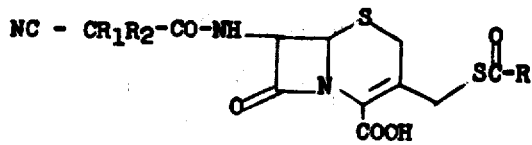

in which R in Example 20 is phenyl.

Equivalents are Great Britain 1,109,525 and Canada 807,651.

17. Glaxo's U.S. Pat. No. 3,479,350 discloses a process for producing 3-pyridiniummethyl cephalosporins which utilizes as an intermediate compounds of the type described in references 2 and 3 above.

18. Ciba's U.S. Pat. No. 3,757,013 discloses compounds of the formula

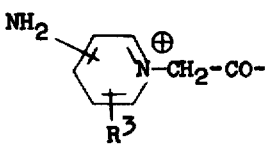

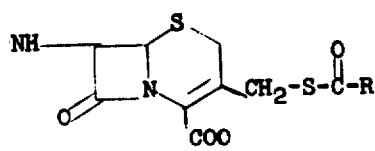

wherein $R^3$ is (lower) alkyl and R is as in 6 above.

19. Bristol's Belgian patent 795,811 (U.S. Pat. No. 3,743,644) discloses compounds of the general formula

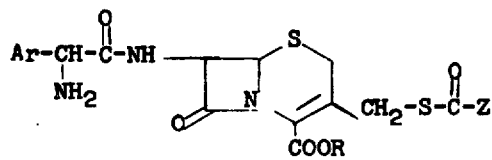

wherein Ar is phenyl, 2-thienyl or 3-thienyl; R is hydrogen, pivaloyloxymethyl, acetoxymethyl, methoxymethyl, acetonyl or phenacyl; and Z is

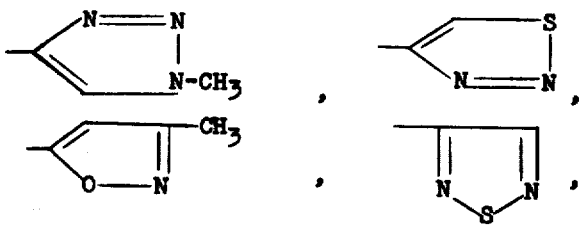

3-isothiazolyl, 4-isothiazolyl or 5-isothiazolyl.

SUMMARY OF THE INVENTION

This invention comprises the acids having the D-configuration in the 7-sidechain and the formula

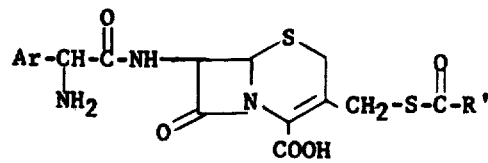

wherein Ar is phenyl, 2-thienyl or 3-thienyl and R' is 3-methyl-1,2,5-oxadiazol-4-yl and easily cleavable esters of said acids including especially the pivaloyloxymethyl, acetoxymethyl, methoxymethyl, acetonyl or phenacyl esters and the pharmaceutically acceptable salts of said acids and esters.

The pharmaceutically acceptable salts referred to above include the nontoxic carboxylic acid salts when R is hydrogen, e.g. nontoxic metallic salts such as sodium, potassium, calcium and aluminum, the ammonium salt and salts with nontoxic amines, e.g. trialkylamines, procaine, dibenzylamine, N-benzyl-β-phenethylamine, 1-ephenamine, N,N'-dibenzylethylenediamine, N-alkylpiperidine and other amines which have been used to form salts of penicillins. Also included within the definition of pharmaceutically acceptable salts are the nontoxic acid addition salts (amine salts) of the acids and esters of Formula I, e.g. salts with mineral acids such as hydrochloric, hydrobromic, hydroiodic, phosphoric and sulfuric and salts with organic acids such as maleic, acetic, citric, oxalic, succinic, banzoic, tartaric, fumaric, mandelic, ascorbic and malic.

Preferred compounds of the present invention are the compounds having the D-configuration in the 7-sidechain and the formula.

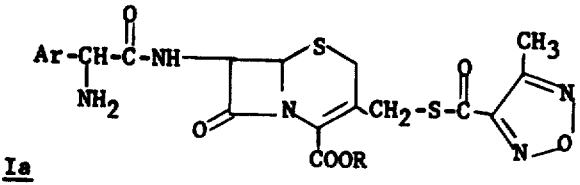

wherein Ar is phenyl, 2-thienyl or 3-thienyl and R is hydrogen, pivaloyloxymethyl, acetoxymethyl, methoxymethyl, acetonyl or phenacyl; and the pharmaceutically acceptable salts thereof. The preferred compounds of formula Ia are those in which Ar is phenyl. An especially preferred compound of formula Ia is that in which Ar is phenyl and R is hydrogen; or the sodium or potassium salt thereof.

Also included in this invention are the compounds (used as either intermediates or metabolic precursors) in which the amino group is "blocked" by substituents such as t-butoxycarbonyl, carbobenzyloxy, formyl, o-nitrophenylsulfenyl, β,β,β-trichloroethoxycarbonyl, 4-oxo-2-pentenyl-2,1-carbomethoxy-1-propenyl-2 and the like. Particularly included in such blocking groups are the ketones (especially acetone) and the aldehydes (especially formaldehyde and acetaldehyde) disclosed for example in U.S. Pat. Nos. 3,198,804 and 3,347,851 and the β-ketoesters and the β-diketones disclosed for example in U.S. Pat. No. 3,325,479 and the β-ketoamides disclosed in Japan 71/24714.

The present invention also includes a process for the preparation of a compound having the formula

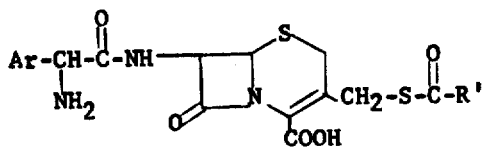

wherein Ar is phenyl, 2-thienyl or 3-thienyl; and R' is 3-methyl-1,2,5-oxadiazol-4-yl; and easily cleavable esters and pharmaceutically acceptable salts thereof; which process comprises either A. reacting a compound of the formula

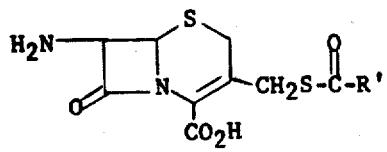

II wherein R' is as defined above or an easily cleavable ester or salt thereof with an acylating derivative of an acid having the formula

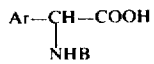

wherein R is an amino-protecting group and Ar is as defined above and removing said amino-protecting group B to produce the desired compound of formula I or an easily cleavable ester or pharmaceutically acceptable salt thereof and, if desired, either before or after removal of protecting group B (a) converting by methods known per se the product in the form of the free acid or salt thereof to a corresponding easily cleavable ester or pharmaceutically acceptable salt thereof or (b) converting by methods known per se the product in the form of the free acid or salt thereof to the corresponding free acid compound or pharmaceutically acceptable salt thereof; or B. reacting a compound of the formula

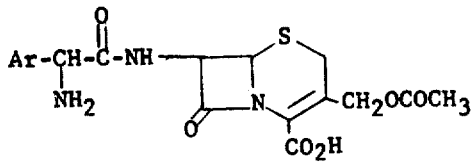

wherein Ar is as defined above or an easily cleavable ester or salt thereof with a heteroaromatic thiolcarboxylic acid of the formula

V wherein R' is as defined above or a salt thereof to form a compound of formula I or an easily cleavable ester or pharmaceutically acceptable salt thereof and, if desired, (a) converting by methods known per se the product in the form of the free acid or salt thereof to a corresponding easily cleavable ester or pharmaceutically acceptable salt thereof or (b) converting by methods known per se the product in the form of an easily cleavable ester or salt thereof to the corresponding free acid compound or pharmaceutically acceptable salt thereof.

The easily cleavable esters referred to above include ester groups which are removable by methods, e.g. chemical or enzymatic hydrolysis, which do not result in any appreciable destruction of the remaining portion of the cephalosporin molecule. Examples of suitable esters include those disclosed in U.S. Pat. Nos. 3,284,451 and 3,249,622 and U.K. patents 1,229,453 and 1,073,530. Particularly preferred esters are the pivaloyloxymethyl, acetoxymethyl, methoxymethyl, acetonyl and phenacyl esters.

In one method of preparing the novel cephalosporin compounds of the present invention, a 3-thiolated-7-aminocephalosporanic acid compound of formula II or an easily cleavable ester of salt of said acid or ester is acylated with the appropriate acylating derivative of formula III.

The 3-thiolated-7-aminocephalosporanic acid intermediate of formula II may be prepared by displacement of the 3-acetoxy group of 7-aminocephalosporanic acid or a salt thereof with the appropriate heteroaromatic thiocarboxylic acid or a salt thereof. The displacement of an ester group with a thiol group is a known reaction and is preferably accomplished in aqueous solution at a temperature of at least room temperature and preferably within the range of about 50° to 100°C. in the presence of a mild base such as sodium bicarbonate.

The claimed compounds may then be obtained by acylation according to known methods of the 7-amino group of intermediate II with the acylating agent of formula III.

Because of the low solubility of the compounds of formula II in common aqueous and non-aqueous solvents, intermediate II is preferably converted prior to the acylation reaction to an easily cleavable ester or acid addition salt thereof. The procedures for preparing such esters are disclosed in the literature and are well-known to those skilled in the art of penicillin and cephalosporin chemistry. One preferred method especially useful for preparing the most preferred easily hydrolyzed esters, i.e. the pivaloyloxymethyl, acetoxymethyl, methoxymethyl, acetonyl and phenacyl esters, is disclosed in U.S. Pat. No. 3,284,451. This reference describes the esterification of sodium cephalothin with the appropriate active chloro or bromo compound (e.g. phenacyl bromide, chloroacetone, chloromethyl methyl ether, pivaloyloxymethyl chloride, acetoxymethyl chloride) followed by enzymatic removal of the thienylacetic acid side-chain. In another good method the triethylamine salt of 7-aminocephalosporanic acid is reacted directly with the active halogen compound as in U.K. patent 1,229,453. The compound of formula II may also be converted to a silyl ester as by the methods described in the literature, e.g. U.S. Pat. No. 3,249,622. The silyl ester group may be removed following the acylation reaction by hydrolysis or alcoholysis.

Prior to the acylation reaction the amino group of acylating agent III is protected by a conventional amino-protecting group B which may be readily removed at the conclusion of the reaction. Examples of suitable amino-protecting groups include t-butoxycarbonyl, carbobenzyloxy, 2-hydroxy-1-naphthcarbonyl, trichloroethoxycarbonyl, 2-ethoxycarbonyl-1-methylvinyl and 2-methoxycarbonyl-1-methylvinyl. A particularly valuable blocking group is a proton, as in the compound of the formula

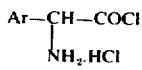

wherein Ar is phenyl, 2-thienyl or 3-thienyl. The preferred amino-protecting groups are t-butoxycarbonyl, the proton and a β-diketone or a β-ketoester as in U.K. patent 1,123,333 or U.S. Pat. Nos. 3,325,479 and 3,316,247, e.g. methyl acetoacetate, or a β-ketoamide as in Japan 71/24714. When the t-butoxycarbonyl, β-ketoester, β-diketone or β-ketoamide protecting groups are employed, it is preferred to convert the acylating acid containing the blocked amino group to a mixed anhydride, e.g. with ethyl or isobutyl chloroformate, before reaction with compound II or an estere or salt thereof. After the acylation coupling reaction, the amino-protecting group B may be removed by methods known per se to form the desired product of formula I. Thus, for example, the t-butoxycarbonyl group may be removed by use of formic acid, the carbobenzyloxy group by catalytic hydrogenation, the 2-hydroxy-1-naphthcarbonyl group by acid hydrolysis, the trichloroethoxycarbonyl group by treatment with zinc dust in glacial acetic acid, the proton by neutralization, etc. Obviously other functionally equivalent blocking groups for an amino group can be used and such groups are considered within the scope of this invention.

Acylation of a 7-amino group of a cephalosporin is a well-known reaction and any of the functional equivalents of formula III commonly used as acylating agents for primary amino groups may be employed. Examples of suitable acylating derivatives of the free acid include the corresponding acid anhydrides, mixed anhydrides, e.g. alkoxyformic anhydrides, acid halides, acid azides, active esters and active thioesters. The free acid may be coupled with compound II after first reacting said free acid with N,N'-dimethylchloroformiminium chloride or by the use of enzymes or of an N,N'-carbonyldiimidazole or an N,N'-carbonylditriazole or a carbodiimide reagent, e.g. N,N'-diisopropylcarbodiimide. N,N'-dicyclohexylcarbodiimide or N-cyclohexyl-N'-(2-morpholinoethyl)-carbodiimide or of alkylylamine reagent or of an isoxazolium salt reagent. Another equivalent of the free acid is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. Another reactive derivative of the phenylglycine acid of formula III is the N-carboxy anhydride (Leuch's anhydride). In this structure the group which activates the carboxyl group also serves to protect the amino group. A particularly preferred acylating agent is the acid chloride hydrochloride of the formula

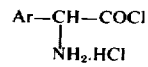

which also serves a dual function of carboxyl activation and amino protection. Mention was made above of the use of enzymes to couple the free acid with its blocked amino group with compound II. Included in the scope of such processes are the use of an ester, e.g. the methyl ester, of that free acid with enzymes provided by various microorganisms, e.g. those described by T. Takahashi et al., *J. Amer. Chem. Soc.*, 94(11), 4035–4037 (1972) and by T. Nara et al., *J. Antibiotics* (Japan), 24 (5), 321–323 (1971) and in West Germany 2,216,113.

The particular process conditions, e.g. temperature, solvent, reaction time, etc. selected for the acylation coupling reaction are determined by the nature of the acylation method used and are known to those skilled in the art. Generally it is useful to add an organic tertiary amine, e.g. triethylamine, N,N-dimethylaniline, ethylpiperidine, 2,6-lutidine or quinoline, to serve as a proton acceptor or salt-forming agent. A preferred method illustrated in the examples which follow involves formation of a silyl ester, e.g. with trimethylchlorosilane, of the intermediate of formula II and acylation of this silylated intermediate in dry methylene chloride at a temperature of below room temperature and preferably about 0°C. with the appropriate chloride hydrochloride acylating agent of formula III in the presence of an organic tertiary amine.

At the conclusion of the acylation reaction, the acylated intermediate is subjected to aqueous hydrolysis to provide the desired cephalosporin product.

The compounds of the present invention may be isolated in any of the ways customarily employed for the isolation of similar cephalosporins. Thus, the product may be obtained as the neutral molecule, although this is probably more accurately represented as the zwitterion, or it may be isolated as a salt. Formation of the desired pharmaceutically acceptable carboxylic acid or acid addition salt is carried out by known methods, e.g. reaction of the acid with an appropriate base or acid.

At the conclusion of the acylation reaction the product obtained may be converted (before or after removal of the amino-protecting group) by methods known per se to another desired product of formula I. Thus, the compound of formula I in the form of the free acid or a salt thereof may be converted by known methods to a corresponding easily cleavable ester or pharmaceutically acceptable salt thereof. Similarly, the product of formula I in the form of an easily cleavable ester or salt thereof may be converted to the free acid product or pharmaceutically acceptable salt thereof by removal of the esterifying group, e.g. by aqueous or enzymatic hydrolysis (as with human or animal serum) or acidic or alkaline hydrolysis or by catalytic hydrogenation or by treatment with sodium thiophenoxide as taught in U.S. Pat. No. 3,284,451.

In another method of preparing the compounds of the present invention, 7-aminocephalosporanic acid or a salt thereof is acylated with the acid of formula III or an acylating derivative thereof to form a 7-acylated cephalosporin compound of the formula

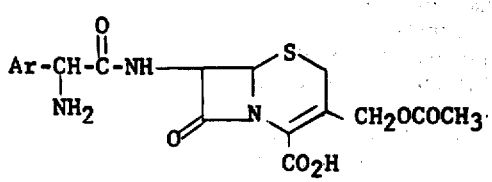

IV

Compound IV in the form of the free acid or an easily cleavable ester or salt thereof is then reacted according to the process of the present invention with a heterocyclic thiolcarboxylic acid of formula V or a salt thereof, most preferably the sodium or potassium salt. The displacement reaction is preferably conducted in aqueous solution at temperatures of about 50°C. or higher in an inert atmosphere, e.g. under nitrogen. The product of the displacement reaction may, if desired, be converted to a pharmaceutically acceptable salt by treatment with an appropriate acid or base. As in the case of the alternate process described above for preparation of the compounds of formula I, the product in the form of the free acid or salt thereof may be converted to a corresponding easily cleavable ester or pharmaceutically acceptable salt thereof or, alternatively, the product in the form of an easily cleavable ester or salt thereof may be converted to the free acid or pharmaceutically acceptable salt thereof.

The easily cleavable esters of the compound of formula I are useful as intermediates in the production of the free acid product. The pivaloyloxymethyl, acetoxymethyl and methoxymethyl esters are also useful as active antibacterial agents since on oral administration they are rapidly hydrolyzed to the active metabolite. These three esters are of particular interest because they provide on oral administration different rates and amounts of absorption and give differing concentrations of the active anitbacterial agent in blood and tissues.

The preferred and most active compounds of the present invention are those having the D-configuration at the α-carbon atom in the 7-sidechain, that is, those made from D-(-)-2-phenyl-glycine, which is also called D-(-)-α-aminophenylacetic acid, and D-(-)-2-thienylglycine and D-(-)-3-thienylglycine. In addition, the configuration at the two optically active asymmetric centers in the β-lactam nucleus is that found in cephalosporin C produced by fermentation and in the 7-aminocephalosporanic acid derived therefrom.

The pharmaceutically active compounds of the present invention are potent antibacterial agents useful in the treatment of infectious diseases in poultry and animals, including man, caused by many Gram-positive and Gram-negative bacteria. The active compounds are of value as nutritional supplements in animal feeds and as agents for the treatment of mastitis in cattle. The free acids and easily hydrolyzed esters thereof have also unexpectedly been found upon oral administration to give blood levels comparable to those of cephalexin.

In view of the wide variability in both antibacterial activity and blood levels shown by prior art cephalosporins of similar structure, e.g. the compounds of Belgian Patent 795,811, it is surprising and unexpected that the particular 3-methyl-1,2,5-oxadiazol-4-ylcarbonylthiomethyl 3-substituent of our invention results in cephalosporin compounds having good antibacterial activity and at the same time blood levels of essentially the same magnitude as those of cephalexin, the only commercial cephalosporin at the present time having sufficient activity and blood levels to be useful as an orally administered product.

The novel medicaments provided by the present invention may be fromulated as pharmaceutical compositions comprising, in addition to the active ingredient, a pharmaceutically acceptable carrier or diluent. The compounds may be administered both orally and parenterally. The pharmaceutical preparations may be in solid form such as capsules, tablets or dragees, or in liquid form such as solutions, suspensions or emulsions. In the treatment of bacterial infections in man, the compounds of this invention may be administered in an amount of from about 5 to 200 mg./kg./day in divided dosages, e.g. 3 to 4 times a day. They are administered in dosage units containing e.g. 125, 250 or 500 mg. of active ingredient with suitable physiologically acceptable carriers or excipients.

PREPARATION OF STARTING MATERIALS

3-Methyl-1,2,5-oxadiazole-4-thiolcarboxylic acid

A mixture of 10.0 g. (7.8 mmole) of 3-methyl-1,2,5-oxadiazole-4-carboxylic acid, 40 ml. of thionyl chloride and 0.5 ml. of N,N-dimethylformamide was heated under reflux for 66 hours. The volatile components were evaporated under reduced pressure at 35°C./20 mm., benzene was added to the residue and the mixture was re-evaporated. The oily acid chloride so obtained was dissolved in 10 ml. of dry benene and the solution was added dropwise to a stirred solution of 15.8 g. (17.2 mmole) of sodium sulfhydrate dihydrate in 150 ml. of 90% aqueous ethanol at such a rate that the reaction temperature was in the range 10°–12°C. After the addition was completed, the slurry was stirred for 50 minutes at 10°–15°C. and then filtered. The filtrate was evaporated under reduced pressure and the residue was dissolved in 100 ml. of water. The pH of the solution was lowered to 2.5 with 6N hydrochloric acid and the product was extracted into three 100 ml. portions of ether. The combined extracts were washed with water, dried over anhydrous magnesium sulfate and evaporated to dryness under reduced pressure. The residue was distilled to provide a yellow oil, b.p. 40°–42°C/0.8 mm. Yield 1.5 g. (13%).

7-Amino-3-(3-methyl-1,2,5-oxadiazol-4-yl)carbonylthiomethyl-3-cephem-4-carboxylic acid To a stirred solution of 8.1 g. (29.8 mmole) of 7-aminocephalosporanic acid and 5.0 g. (59.6 mmole) of sodium bicarbonate in 140 ml. of 0.1 M aqueous phosphate (buffered at pH 6.4) was added a solution of 4.3 g. (29.8 mmole) of 3-methyl-1,2,5-oxadiazole-4-thiolcarboxylic acid in 15 ml. of acetone. The mixture was stirred under a nitrogen atmosphere for 16 hours at 35°C. The product was collected by filtration, washed with water and acetone and dried in vacuo over phosphorus pentoxide to afford 2.77 g. (26%) of tan solid.

Analysis: Calcd.for: $C_{12}H_{12}N_4O_5S_2$: C, 40.45; H, 3.40; N, 15.73; Found: C, 40.47; H, 3.50; N, 15.36.

Pivaloyloxymethyl 7-amino-3-(3-methyl-1,2,5-oxadiazol-4-yl)carbonylthiomethyl-3-cephem-4-carboxylate Method A The title compound is produced by substituting for the 7-aminocephalosporanic acid used immediately above an equimolar weight of pivaloyloxymethyl 7- aminocephalosporanate hydrochloride prepared according to Example 2 of U.K. 1,229,453 from 7-aminocephalosporanic acid. German 1,904,585 (Farmdoc 39,445) is equivalent to U.K. 1,339,453.

Method B

The title compound is produced by substituting for the 0.025 mole (6.8 g.) 7-aminocephalosporanic acid used in the procedure of Example 2 of U.K. 1,229,453 an equimolar weight of 7-amino-3-(3-methyl-1,2,5-oxadiazol-4-yl)carbonylthiomethyl-3-cephem-4-carboxylic acid.

The respective acetoxymethyl, methoxymethyl, acetonyl and phenacyl esters of 7-amino-3-(3-methyl-1,2,5-oxadiazol-4-yl)carbonylthiomethyl-3-cephem-4-carboxylic acid are prepared by sutstituting in Method B above for the chloromethyl pivalate used therein an equimolar weight of chloromethyl acetate, chloromethyl methyl ether, chloroacetone and phenacyl bromide, respectively.

EXAMPLES

The following examples are given in illustration of, but not in limitation of, the present invention. All temperatures are in degrees centigrade.

EXAMPLE 1

7-[D-(-)-α-Aminophenylacetamido]-3-(3-methyl-1,2, 5-oxadiazol-4-yl)carbonylthiomethyl-3-cephem-4-carboxylic acid

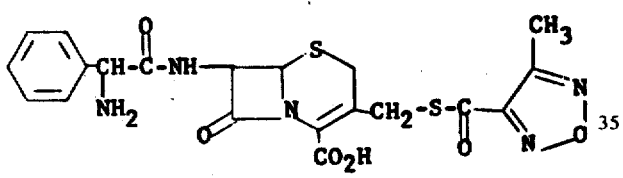

To a stirred slurry of 2.70 g. (7.6 mmole) of 7-amino-3-(3-methyl-1,2,5-oxadiazol-4-yl)carbonyl-thiomethyl-3-cephem-4-carboxylic acid in 100 ml. of dry methylene chloride were added in succession 1.54 g. (15.2 mmole) of triethylamine, 0.92 g. (7.6 mmole) of N,N-dimethylaniline and 2.48 g. (7.6 mmole) of trimethylchlorosilane. The mixture was heated under reflux for 20 minutes and the resulting clear solution was cooled to 2°. In one portion, 1.57 g. (7.6 mmole) of D-(-)-2-phenylglycyl chloride hydrochloride was added and the mixture was stirred vigorously for 1 hour at 2°–5° and for 1 hour without external cooling. Addition of 50 ml. of water caused the product to precipitate and the solid was collected by filtration, washed with water and acetone and dried in vacuo over phosphorus pentoxide to provide 2.1 g. (56%) of amorphous solid, mp 180°–182°C. (dec.). The infrared spectrum (KBr disc) showed absorption maxima (cm$^{-1}$) at 1780 (β-lactam carbonyl), 1690 (amide carbonyl), 1660 (thiolester carbonyl), 1620 and 1395 (carboxylate) and 710 (phenyl). The NMR spectrum of a solution in $d_6$-dimethylsulfoxide and deuterium oxide gave signals (ppm from tetramethylsilane) which were assigned as follows: 7.47 (s, 5H) due to the benzene ring protons; 5.72 (d, 1H) for the $C_7$ proton; 5.03 (s, 1H) for the benzylic proton; 4.97 (d, 1H) for the $C_6$ proton, 2.50 (s, 3H) for the methyl protons; AB quartets centered at 4.15 and 3.50 for the exomethylene and $C_2$ methylene protons respectively.

This sample of 7-[D-(-)-α-aminophenylacetamido]-3-(3-methyl-1,2,5-oxadiazol-4-yl)carbonylthiomethyl-3-cepham-4-carboxylic acid (called New Compound) after solution in DMSO (dimethyl sulfoxide) at 14 mgm./ml. followed by dilution with Nutrient Broth was found to exhibit the following Minimum Inhibitory Concentrations (M.I.C.) in mcg./ml. versus the indicated microorganisms as determined by overnight incubation at 37°C. by tube dilution. The in vitro activity of cephalexin, a commercial oral cephalosporin, is included in Table I.

Table I

| Organism | M.I.C. in mcg./ml. | |
|---|---|---|
| | New Compound | Cephalexin |
| D. pneumoniae+ 5% serum* | A9585 | .01 | .08 |
| Str. pyogenes+ 5% serum* | A9604 | .01 | .08 |
| S. aureus Smith + | A9537 | .6 | .6 |
| S. aureus Smith + 50% serum + | A9537 | 32 | 1.3 |
| S. aureus BX 1633-2 at 10$^{-3}$ dilution | A9606 | 2.5 | 1 |
| S. aureus BX 1633-2 at 10$^{-2}$ dilution | A9606 | 8 | 2 |
| S. aureus methicillin-resistant at 10$^{-3}$ dilution | A15097 | 32 | 16 |
| S. aureus at 10$^{-3}$ dilution | A9748 | 32 | 16 |
| S. aureus at 10$^{-2}$ dilution | A9748 | 32 | 63 |
| Sal. enteritidis + | A9531 | 1 | 2 |
| E. coli Juhl + | A15119 | 32 | 8 |
| E. coli + | A9675 | 32 | 16 |
| K. pneumoniae + | A9977 | 8 | 4 |
| K. pneumoniae + | A15130 | 63 | 16 |
| Pr. mirabilis + | A9900 | 4 | 4 |
| Pr. morganii + | A15153 | >125 | >125 |
| Ps. aeruginosa + | A9843A | >125 | >125 |
| Ser. marcescens+ | A20019 | >125 | >125 |

*50% Nutrient Broth - 45% Antibiotic Assay Broth
+at 10$^{-4}$ dilution

Blood levels in the mouse after oral administration were determined with the following results:

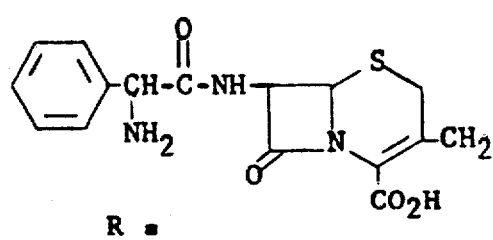

| | Blood Level in mcg./ml. | | | |
|---|---|---|---|---|
| Dose mgm./kg. | 0.5 | 1 | 2 | 3.5 |
| | Hrs. after administration, | | | |

| Structure | | | | | |
|---|---|---|---|---|---|
| 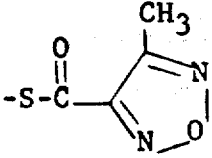 | 100 | 38.6 | 28.3 | 13.7 | 4.4 |
| - H (cephalexin)-monohydrate | 100 | 41.4 | 26.7 | 6.0 | 0.87 |

EXAMPLE 2

Sodium 7-[D-(-)-α-aminophenylacetamido]-3-(3-methyl-1,2,5-oxadiazol-4-yl)carbonylthiomethyl-3-cephem-4-carboxylate

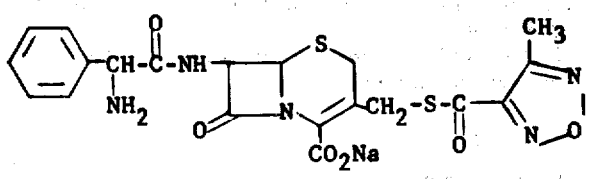

To a stirred aqueous suspension of the zwitter-ionic form of 7-[D-(-)-α-aminophenylacetamido]-3-(3-methyl-1,2,5-oxadiazol-4-yl)carbonylthiomethyl-3-cephem-4-carboxylic acid (0.8 mmole) is added 1N aqueous NaOH at room temperature until a clear solution (pH 10.8) is obtained. The solution is immediately freeze-dried to give impure, solid sodium 7-[D-(-)-α-aminophenylacetamido]-3-(3-methyl-1,2,5-oxadiazol-4-yl)carbonylthiomethyl-3-cephem-4-carboxylate.

Following the same general procedure as above, use of 1N KOH in place of the NaOH used therein produces potassium 7-[D-(-)-α-aminophenylacetamido]-3-(3-methyl-1,2,5-oxadiazol-4-yl)carbonylthiomethyl-3-cephem-4-carboxylate.

EXAMPLE 3

7-[D-(-)-α-Amino-α-(3-thienyl)acetamido]-3-(3-methyl-1,2,5-oxadiazol-4-yl)carbonylthiomethyl-3-cephem-4-carboxylic acid

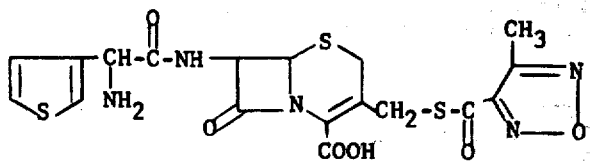

The above compound is prepared by sutstituting an equimolar weight of D-(-)-α-amino-α-(3-thienyl)-acetyl chloride hydrochloride in the procedure of Example 1 for the D-(-)-2-phenylglycyl chloride hydrochloride used therein

EXAMPLE 4

7-[D-(-)-α-Amino-α-(2-thienyl)acetamido]-3-(3-methyl-1,2,5-oxadiazol-4-yl)carbonylthiomethyl-3-cephem-4-carboxylic acid

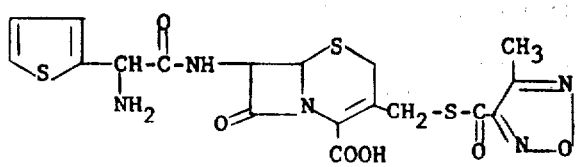

The above compound is prepared by substituting an equimolar weight of D-(-)-α-amino-α-(2-thienyl)-acetyl chloride hydrochloride in the procedure of Example 1 for the D-(-)-2-phenylglycyl chloride hydrochloride used herein.

EXAMPLE 5

Acetoxymethyl 7-[D-(-)-α-aminophenylacetamido]-3-(3-methyl-1,2,5-oxadiazol-4-yl)carbonylthiomethyl-3-cephem-4-carboxylate

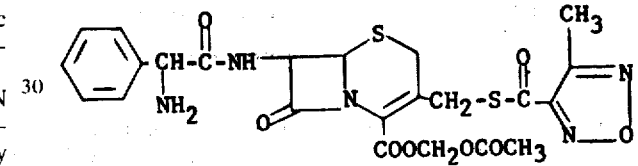

To a solution of acetoxymethyl 7-amino-3-(3-methyl-1,2,5-oxadiazol-4-yl)carbonylthiomethyl-3-cephem-4-carboxylate (regenerated from 0.009 mole of its hydrochloride) in 30 ml. ethyl acetate is added 0.020 mole pyridine. The mixture is cooled in ice and stirred while 0.010 mole D-(-)-2-phenylglycyl chloride hydrochloride in 30 ml. ethyl acetate is added over ten minutes. After a further 20 minutes in the cold, stirring is continued at room temperature for 1 hour. Then the mixture is washed successively with aqueous NaHCO₃, 0.1N HCl and water, dried and evaporated in vacuo to leave the desired acetoxymethyl 7-[D-(-)-α-aminophenylacetamido]-3-(3-methyl-1,2,5-oxadiazol-4-yl)carbonylthiomethyl-3-cephem-4-carboxylate as an oil which crystallizes upon trituration in cyclohexane.

The respective pivaloyloxymethyl, methoxymethyl, acetonyl and phenacyl esters corresponding to the above acetoxymethyl ester are produced by replacing the acetoxymethyl 7-amino-3-(3-methyl-1,2,5-oxadiazol-4-yl)carbonylthiomethyl-3-cephem4-carboxylate hydrochloride used in the above procedure with 0.009 mole of the hydrochloride of pivaloyloxymethyl, methoxymethyl, acetonyl and phenacyl esters of 7-amino-3-(3-methyl-1,2,5-oxadiazol-4-yl)carbonylthiomethyl-3-cephem-4-carboxylic acid, respectively.

EXAMPLE 6

Acetoxymethyl 7-[D-(-)-α-amino-α-(3-thienyl)-acetamido]-3-(3-methyl-1,2,5-oxadiazol-4-yl)carbonyl-thiomethul-3-cephem-4-carboxylate

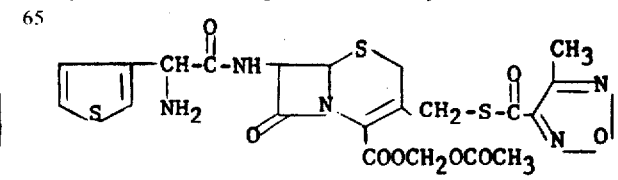

The above compound is prepared according to Example 5 by substituting for the D-(-)-2-phenylglycyl chloride hydrochloride used therein an equimolar amount of D-(-)-α-amino-α-(3-thienyl)acetyl chloride hydrochloride.

The respective pivaloyloxymethyl, methoxymethyl, acetonyl and phenacyl esters corresponding to the above acetoxymethyl ester are produced by replacing the acetoxymethyl 7-amino-3-(3-methyl-1,2,5-oxadiazol 4-yl)carbonylthiomethyl-3-cephem-4-carboxylate hydrochloride used in the above procedure with 0.009 mole of the hydrochloride of pivaloyloxymethyl, methoxymethyl, acetonyl and phenacyl esters of 7-amino-3-(3-methyl-1,2,5-oxadiazol- 4-yl)carbonylthiomethyl-3-cephem-4-carboxylic acid, respectively.

EXAMPLE 7

Acetoxymethyl 7-[D-(-)-α-amino-α(2-thienyl)-acetamido]-3-(3-methyl-1,2,5-oxadiazol-4-yl)carbonylthiomethyl-3-cephem-4-carboxylate

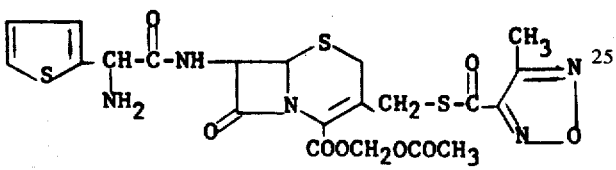

The above compound is prepared according to Example 5 by substituting for the D-(-)-2-phenylglycyl chloride hydrochloride used therein an equimolar amount of D-(-)-α-amino-α-(2-thienyl)-acetyl chloride hydrochloride.

The respective pivaloyloxymethyl, methoxymethyl, acetonyl and phenacyl esters corresponding to the above acetoxymethyl ester are produced by replacing the acetoxymethyl 7-amino-3-(3-methyl-1,2,5-oxadiazol-4-yl)carbonylthiomethyl-3-cephem-4-carboxylate hydrochloride used in the above procedure with 0.009 mole of the hydrochloride of pivaloyloxymethyl, methoxymethyl, acetonyl and phenacyl esters of 7-amino-3-(3-methyl-1,2,5-oxadiazol-4-yl)carbonylthiomethyl-3-cephem-4-carboxylic acid, respectively.

EXAMPLE 8

The general procedure of Example 2 is repeated using the zwitterionic forms of the acids shown below in place of the 7-[D-(-)-α-aminophenylacetamido]-3-(3-methyl-1,2,5-oxadiazol-4-yl)carbonylthiomethyl-3-cephem-4-carboxylic acid used therein.

Use of:

7-[D-(-)-α-amino-α-(3-thienyl)acetamido]-3-(3-methyl-1,2,5-oxadiazol-4-yl)carbonylthiomethyl-3-cephem-4-carboxylic acid, and 7-[D-(-)-α-amino-α-(2-thienyl)acetamido]-3-(3-methyl-1,2,5-oxadiazol-4yl)carbonylthiomethyl-3-cephem-4-carboxylic acid produced, respectively, Sodium 7-[D-(-)-α-amino-α-(3-thienyl)acetamido]-3-(3-methyl-1,2,5-oxadiazol-4-yl)carbonylthiomethyl-3-cephem-4-carboxylate, Potassium 7-[D-(-)-α-amino-α-(3-thienyl)acetamido]-3-(3-methyl-1,2,5-oxadiazol-4-yl)carbonylthiomethyl-3-cephem-4-carboxylate, Sodium 7-[D-(-)-α-amino-α-(2-thienyl)acetamido]-3-(3-methyl-1,2,5-oxadiazol-4-yl)carbonylthiomethyl-3-cephem-4-carboxylate, and Potassium 7-[D-(-)-α-amino-α-(2-thienyl)acetamido]-3-(3-methyl-1,2,5-oxadiazol-4-yl)-carbonylthiomethyl-3-cephem-4-carboxylate.

We claim:

1. A compound having the D-configuration in the 7-sidechain and the formula

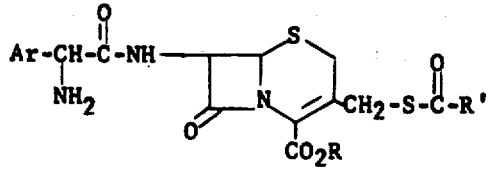

wherein Ar is phenyl, 2-thienyl or 3-thienyl; R is hydrogen, pivaloyloxymethyl, acetoxymethyl, methoxymethyl, acetonyl or phenacyl; and R' is 3-methyl-1,2,5-oxadiazol-4-yl; or a pharmaceutically acceptable salt thereof.

2. An acid having the D-configuration in the 7-sidechain and the formula

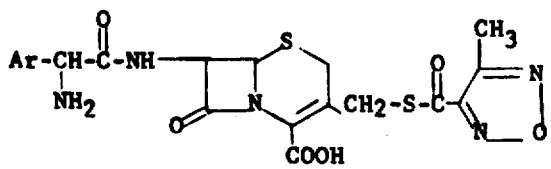

wherein Ar is phenyl, 2-thienyl or 3-thienyl; or a pharmaceutically acceptable salt thereof.

3. A compound of claim 1 having the formula

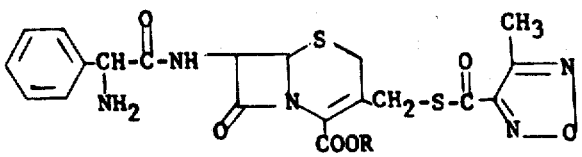

wherein R is hydrogen, pivaloyloxymethyl, acetoxymethyl, methoxymethyl, acetonyl or phenacyl; or a pharmaceutically acceptable salt thereof.

4. The acid of claim 2 having the formula

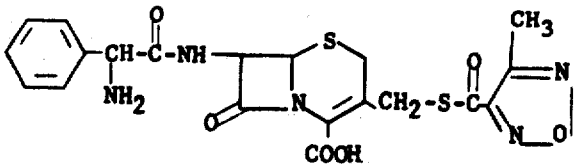

5. The sodium salt of the acid of claim 4.
6. The potassium salt of the acid of claim 4.
7. The zwitterion form of the acid of claim 4.
8. A pharmaceutically acceptable acid addition salt of the acid of claim 4.
9. The pivaloyloxymethyl ester of the acid of claim 4.
10. The acetoxymethyl ester of the acid of claim 4.
11. The methoxymethyl ester of the acid of claim 4.
12. The acetonyl ester of the acid of claim 4.
13. The phenacyl ester of the acid of claim 4.
14. The compound of claim 1 having the formula

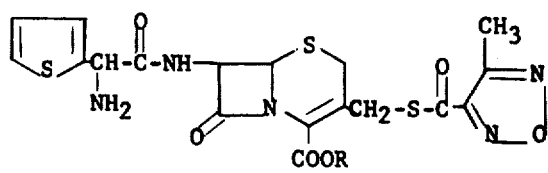

wherein R is hydrogen, pivaloyloxymethyl, acetoxymethyl, methoxymethyl, acetonyl or phenacyl; or a pharmaceutically acceptable salt thereof.

15. The acid of claim 2 having the formula

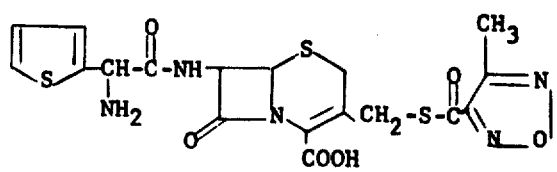

16. The sodium salt of the acid of claim 15.
17. The potassium salt of the acid of claim 15.
18. The zwitterion form of the acid of claim 15.
19. A pharmaceutically acceptable acid addition salt of the acid of claim 15.
20. The pivaloyloxymethyl ester of the acid of claim 15.
21. The acetoxymethyl ester of the acid of claim 15.
22. The methoxymethyl ester of the acid of claim 15.
23. The acetonyl ester of the acid of claim 15.
24. The phenacyl ester of the acid of claim 15.
25. The compound of claim 1 having the formula

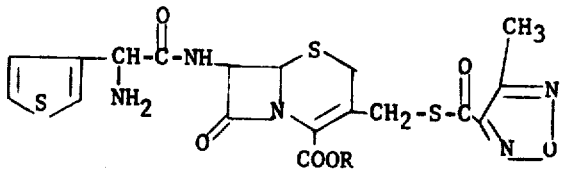

wherein R is hydrogen, pivaloyloxymethyl, acetoxymethyl, methoxymethyl, acetonyl or phenacyl; or a pharmaceutically acceptable salt thereof.

26. The acid of claim 2 having the formula

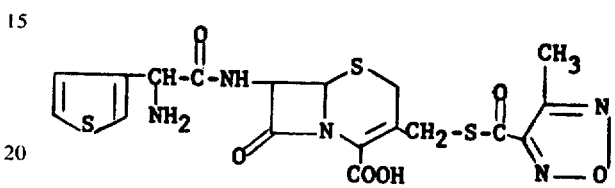

27. The sodium salt of the acid of claim 26.
28. The potassium salt of the acid of claim 26.
29. The zwitterion form of the acid of claim 26.
30. A pharmaceutically acceptable acid addition salt of the acid of claim 26.
31. The pivaloyloxymethyl ester of the acid of claim 26.
32. The acetoxymethyl ester of the acid of claim 26.
33. The methoxymethyl ester of the acid of claim 26.
34. The acetonyl ester of the acid of claim 26.
35. The phenacyl ester of the acid of claim 26.

* * * * *